United States Patent Office.

FRANCES P. GARDINER, OF NEW HAVEN, CONNECTICUT.

Letters Patent No. 61,730, dated February 5, 1867.

IMPROVED MEDICAL COMPOUND FOR CURE OF CATARRH.

*The Schedule referred to in these Letters Patent and making part of the same.*

TO ALL WHOM IT MAY CONCERN:

Be it known that I, FRANCES P. GARDINER, of New Haven, in the county of New Haven, and State of Connecticut, have invented a new Catarrh Cure; and I do hereby declare the following to be a full, clear, and exact description of the same.

This invention is designed for the cure of catarrh, and consists in the combination of Scotch snuff, castile soap, and tannin; and to enable others to prepare the same, I will proceed to describe my manner of so doing.

I take, of common Scotch snuff, say, one-half pound, and one-half pound of castile soap, and one-fourth ounce of tannin. I first grate the soap to a fine powder; then thoroughly mix the three ingredients and the remedy is ready for use, to be taken in the usual manner of taking snuff, a single "pinch" three times per day until relieved. The proportions mentioned are such as I believe to produce the best results, yet I do not wish to be confined to the precise proportions mentioned, as a variation will not materially affect the result.

Having thus fully described my invention, what I claim as new and useful, and desire to secure by Letters Patent, is—

The herein-described compound, prepared substantially as set forth.

FRANCES P. GARDINER.

Witnesses:
   JOHN E. EARLE,
   JOHN H. SHUMWAY.